O. P. DOWNING.
VEHICLE WHEEL.
APPLICATION FILED DEC. 4, 1911.

1,173,490.

Patented Feb. 29, 1916.
2 SHEETS—SHEET 1.

Witnesses

Inventor
O. P. Downing.
By
Attorney.

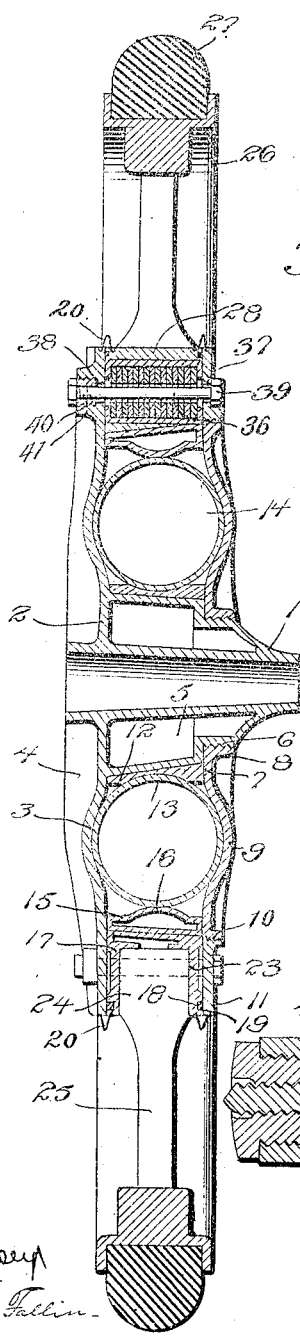

UNITED STATES PATENT OFFICE.

OTTO P. DOWNING, OF PECOS, TEXAS, ASSIGNOR TO DOWNING PNEUMATIC WHEEL COMPANY, A CORPORATION OF ARIZONA.

VEHICLE-WHEEL.

1,173,490.  Specification of Letters Patent.  Patented Feb. 29, 1916.

Application filed December 4, 1911. Serial No. 663,845.

*To all whom it may concern:*

Be it known that I, OTTO P. DOWNING, a citizen of the United States, residing at Pecos, in the county of Reeves and State of Texas, have invented certain new and useful Improvements in Vehicle-Wheels, of which the following is a specification.

This invention relates to vehicle wheels, and has as its object to provide a wheel which will possess the same elasticity as a pneumatic tired wheel, although provided with solid rubber tires.

The wheel of the invention belongs to that type in which a pneumatic cushion is arranged between a fixed hub and a floating hub, this cushion being designed to absorb shocks in the same manner as does the ordinary pneumatic tire. The wheels of this type, as usually constructed, present the disadvantage that should the pneumatic cushion become punctured, or should it "blow out", due to being subjected to extraordinarily heavy pressure, the wheel is rendered practically useless, as it cannot be used without danger of permanently injuring or breaking the connecting parts between the fixed and floating hubs. For this reason, such wheels present but little advantage over an ordinary pneumatic tired wheel.

It is therefore the primary aim of the present invention to provide a secondary cushioning or shock absorbing means which will act not only to limit the degree of pressure to which the pneumatic cushion may be subjected, but will also serve as a means for cushioning the connection between the fixed and floating hubs should this cushion become punctured, or should it for any other reason become deflated. The provision of such a secondary cushioning means insures against injury to the wheel subsequent to deflation of the pneumatic cushion and before such deflation has been noticed by the driver of the vehicle, supported by the wheel, or before the vehicle can be brought to a stop.

A further aim of the invention is to provide novel means for rigidly connecting the fixed and floating hubs of the wheel so that they can have no relative movement this means being employed subsequent to deflation of the pneumatic cushion.

A further object of the invention is to provide a wheel of the type mentioned so constructed that the pneumatic cushion may be readily removed at any time, and a new cushion inserted, this being accomplished without the removal of any of the bolts, or like fastening devices.

For a full understanding of the invention reference is to be had to the following description and accompanying drawing, in which:—

Figure 1:
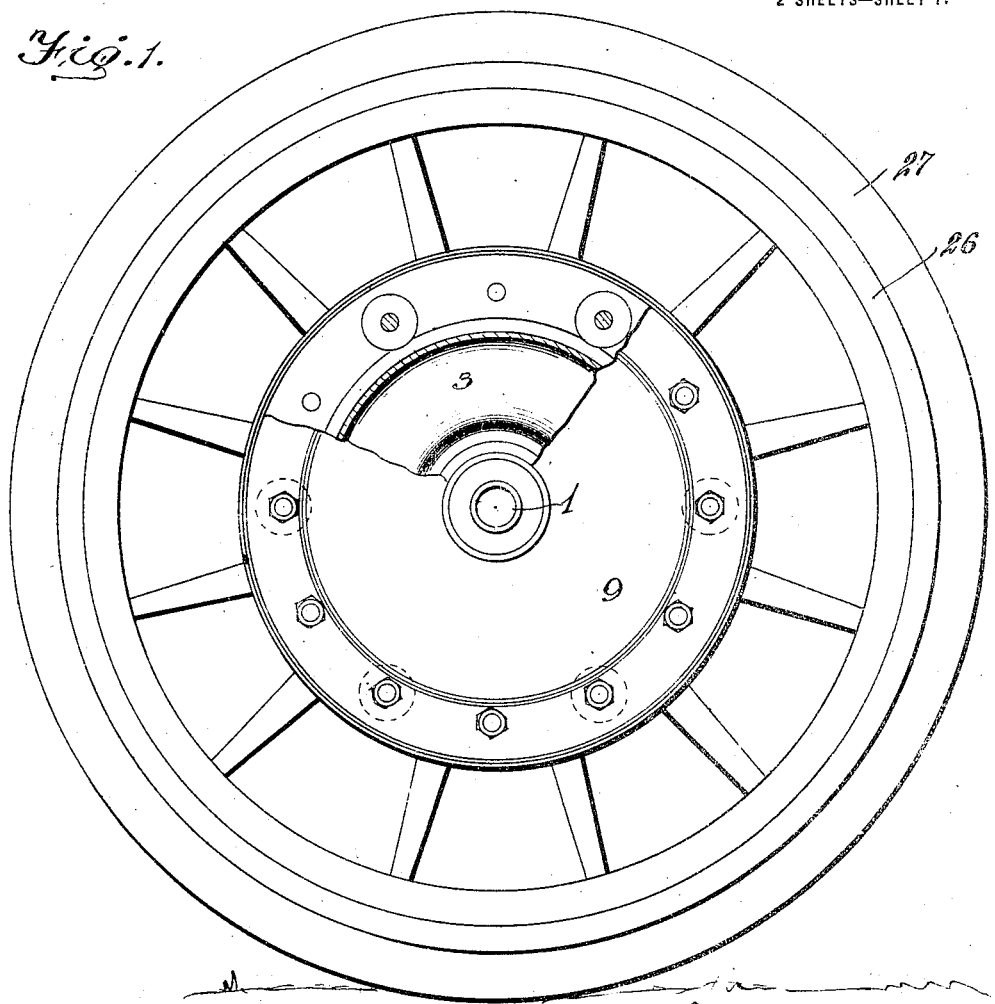
Figure 2:
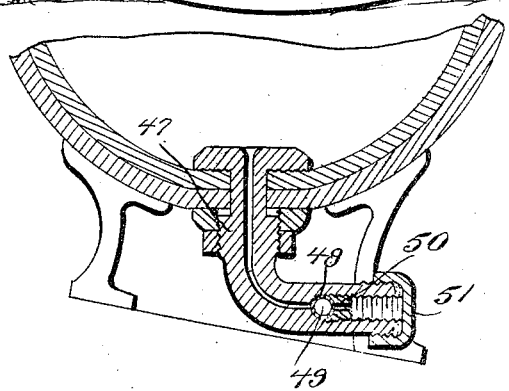

Figure 1 is a view in side elevation and partly in section of the wheel embodying the present invention. Fig. 2 is a vertical transverse sectional view therethrough. Fig. 3 is a view partly in elevation and partly in longitudinal section of one of the shock absorbers of the wheel. Fig. 4 is a similar view showing another type of shock absorbers. Fig. 5 is a detail vertical transverse sectional view illustrating the means for rigidly connecting the fixed and floating hubs of the wheel. Fig. 6 is a detail view illustrating the manner of mounting the bolts which connect the spaced portions of the fixed hub of the wheel. Fig. 7 is a detail sectional view illustrating the valve for inflating the pneumatic cushion of the wheel.

Corresponding and like parts are referred to in the following description and indicated in all the views of the drawings by the same reference characters.

In the drawings, the fixed hub of the wheel is illustrated as comprising a sleeve-portion 1, designed to fit the spindle of the axle upon which the wheel is mounted, and integral with this sleeve-portion 1, is a head 2 which is substantially circular and is provided with an annular outwardly bulged portion 3. Radial reinforcing ribs 4 are formed upon the outer face of this head 2 and preferably extend from the inner end of the sleeve 1 to the peripheries of the said head. An annular shoulder or seat 5 is integral with the inner face of the said head 2 and with the sleeve-portion 1 of the hub, and this shoulder is tapered in the direction of the outer end of the said sleeve-portion, as clearly shown in Fig. 2 of the drawings. Near its outer end, the shoulder is reduced in diameter and is threaded as indicated by the numeral 6. An annular head 7 constitutes a portion of the fixed hub of the wheel and has its inner periphery threaded as at 8 and the head is screwed onto the threaded portion of the shoulder 5, as illustrated in Fig. 2, whereby it will be positioned opposite and in spaced relation to the head 2. The head 7 is formed, as in the case of the head 2, with an annular outwardly bulged portion 9 and the bulged portions 3 and 9 of the heads 2 and 7 respectively, are oppositely located and are designed to receive between them the pneumatic cushion of the wheel, as will be presently explained. The head 7 has its outer periphery threaded as at 10 and an annular rim member 11 is threaded onto the head 7 in the manner illustrated in Fig. 2 and completes the fixed hub. As will be presently explained, the annular rim member 11 is held rigid with respect to the head 2 so that when desired, the head 7 may be rotated to unthread it from between the shoulder 5 and the said rim member without disturbing the rim member.

A tapered ring 12 is removably fitted upon the tapered shoulder 5 which surrounds the sleeve-portion 1 of the fixed hub, and due to the fact that this ring is tapered it may be readily removed or set into place. This ring is formed exteriorly and circumferentially with a shallow seat 13 in which rests the inner peripheral portion of the pneumatic cushion of the wheel, which cushion is indicated by the numeral 14 and resembles a small pneumatic tire. An exteriorly tapered ring 15 is held between the heads 2 and 7 in a manner to be presently explained and encircles the pneumatic cushion 14, and is provided interiorly with an annular bulged portion or rib 16 which rests and bears against the outer side of the said pneumatic cushion 14. The tapered ring 15 constitutes, in effect, an element of the floating hub of the wheel, which hub will now be fully described.

The floating hub of the wheel includes an annular interiorly tapered body 17 which is of a thickness to fit slidably between the outer portion of the head 2 and the annular rim member 11. This body member 17 is formed in its opposite sides with annular grooves 18 in which are seated packing rings 19 having contact with the opposite sides of the head 2 and rim member 11. In order to exclude dust and dirt from between the sides of the body 17 and the opposing faces of the head 2 and rim member 11, a strip 20 of rubber or cloth, or a combination of the two is arranged about the wheel at the line of contact between the said head and rim member and the body 17, and these strips are held in place by means of wires or rings 21 sprung into grooves 22 formed in the outer peripheries of the head 2 of the rim member 11 and at each side of the peripheries of the body-member 17. By referring to Fig. 2, it will be observed that the body-member 17 may have free movement with relation to the parts of the fixed hub between which it is arranged without in any way being interfered with by the strips 20.

At intervals, the body-member 17 of the floating hub is formed with sockets 23 in which are fitted the butts 24 of spokes 25. These spokes 25 support, at their outer ends, the rim 26 of the wheel, in or upon which rim is fitted a solid rubber tire 27. At suitable intervals, the annular body 17 of the floating hub is formed with openings 28, the walls of which are cylindrical and in these openings are fitted shock absorbing devices which will now be described.

In the construction of this wheel, there are employed other types of shock absorbing devices which are auxiliary to the pneumatic cushion 14 and the shock absorbers of one type are pneumatic and those of the other type are of cushioning material. Each of the pneumatic shock absorbers is in the nature of a hollow, cylindrical, inflatable, chamber, and is made up of an outer layer or sheath of canvas, indicated by the numeral 28', and an inner layer 29 of rubber, and in one end of each of these absorbers there is arranged an air valve 30 designed for the attachment of a pump whereby the absorber may be inflated. The opening or passage through this absorber is indicated by the numeral 31. Each absorber of the other type mentioned above comprises a cylindrical metallic casing 32 formed at one end with an inwardly projecting annular flange 33 and interiorly threaded at its opposite end. An annular nut or head 34 is threaded into the last mentioned end of the casing 32 and arranged within the casing between the flange 33 and the said head 34 are a number of annular disks 35 of spongy rubber or similar cushioning material. The inner peripheries of the annular head 34 is formed with oppositely located notches 36' for the engagement with the head of a spanner wrench by which the head may be rotated to compress the disks 35 to the desired degree, so that the entire bank of disks will possess a greater or less degree of elasticity. It will be observed that the openings in the disks 35 are of less diameter than the openings defined by the inner peripheries of the flange 33 and head 34, and the function of this proportioning of the parts will presently be made clear. In assembling the shock absorbers above described, with the annular body 17 of the floating hub they are inserted into the openings 28 in the said body, and are arranged, at the time of assemblage with the body, alternately. It will be understood from inspection of Fig. 2 of the drawings, that the absorbers of both types are of a length equal to the thickness of the body 17.

Bolts 36 are inserted through alined openings 37 and 38 in the head 2 and rim member 11, respectively, and each of these is provided at one end with a head 39 which bears against the rim member 11, and at its other end is threaded into a sleeve nut 40 which in turn is threaded into a hollow interiorly threaded boss 41 formed upon the outer side of the head 2. These bolts are engaged through the openings in the shock absorbers and as will be noted from inspection of the drawings, are of a diameter less than that of the said openings.

From the foregoing it will be readily understood that the floating hub may have a limited movement with respect to the fixed hub before the bolts 36 will engage with the openings in the shock absorbers and the floating hub is cushioned in this movement by the pneumatic cushion 14. Should the shock imparted to the wheel be so great as to cause the bolts 36 to engage with the walls of the openings in the shock absorbers through which they extend, the absorbers will be compressed to a greater or less degree, it being understood that greater resistance is offered by the absorbers which include the filling of the soft rubber disks 35, than by the pneumatic shock absorbers, and it will be further understood that shock absorbers of two different types capable of offering resistance, in different degrees, are employed, for the reason that if all of the shock absorbers were of the type including the disks 35, too great a resistance would be offered, and on the other hand if all the absorbers were of the pneumatic type, a deflation of any one or several of the absorbers would in part render the wheel useless for the time being.

The advantage of having the bolts 36 mounted at their threaded ends in sleeve-nuts 40 which in turn are threaded into bosses 41 upon the head 2 of the fixed hub is that should the shank of any one of the bolts become broken, a greater or less portion thereof would still be supported in the opening in the shock absorbers, and at the time of removing the broken bolt for the purpose of substituting a new one, it would only be necessary to unscrew the sleeve-nut from the boss, and this nut would draw out with it the fractured portion of the shank.

As before stated, the invention contemplates the provision of means for rigidly connecting or uniting the fixed and floating hubs so that even should the cushion 14 and one or several of the shock absorbers be rendered inoperative, by reason of deflation, the wheel itself would not be rendered useless, and this means consists of a number of bolts 42 which are designed to be threaded into opening 43 formed in the head 2 of the fixed hub, these bolts being provided with unthreaded conoidal heads beyond their threaded portions, which heads indicated by the numeral 44 are designed to enter similarly formed openings 45 in the annular body 17 of the floating hub. When these bolts 42 are not in use, the openings 43 are closed by means of bolts 46 having comparatively short shanks, which shanks, are in fact so short as not to contact or engage with the adjacent side of the said annular body 17.

Referring to Fig. 7 of the drawings, it will be observed that the pneumatic cushion 14 is to be inflated through the medium of an air valve which is indicated in general by the numeral 47 and is fitted through the inner side of the pneumatic cushion 14 in the manner illustrated in Fig. 7 of the drawings and has its stem extended into and through one side of the ring 12. The stem, at and adjacent its outer end is interiorly enlarged as at 48 and has fitted therein a ball-valve 49 and a valve-seat 50 against which the valve 49 is designed to rest to prevent escape of air from the said cushion. A cap 51 is removably fitted upon the said end of the stem of the valve and serves as an additional means for preventing the escape of air.

From the foregoing description of the invention it will be seen that there is provided a wheel which possesses the desired degree of resiliency and possesses all the advantages of a pneumatic tired wheel, although possessing none of the disadvantages thereof, for the reason that even should the pneumatic cushions of the wheel of this invention become deflated, the wheel is not rendered useless, and the operator of the automobile or other vehicle, supported by the wheel, is not required to leave his machine standing until a new tire can be applied, which is frequently necessary in the use of the ordinary pneumatic tired wheels, for the reason that they cannot be run over rough roads on their bare rims.

Having thus described the invention what is claimed as new is:—

1. In a vehicle wheel, a relatively fixed hub exteriorly of substantially frusto-conical form, the smaller end of the hub being formed with a shoulder, a tapered ring fitted thereon inward of the shoulder, a floating hub including an interiorly tapered annular body disposed to surround the relatively fixed hub, a tapered ring fitted within said body, a cushion confined between the rings, and spaced heads, one formed upon the hub and the other detachably engaging therewith and bearing against the said shoulder, said heads being dished to conform to and bear against the sides of the cushion.

2. In a vehicle wheel, a relatively fixed hub having an exteriorly tapered body portion, a floating hub having an annular body interiorly tapered and disposed to surround the said body of the fixed hub, the said fixed hub further including a stationary head and a rim fixed with respect to and spaced therefrom, an interiorly tapered ring fitted upon the tapered body by the fixed hub, an exteriorly tapered ring fitted within the tapered body of the floating hub, a pneumatic cushion arranged between the rings, and a head member threaded onto the body of the fixed hub and into the rim of the said fixed hub.

3. In a vehicle wheel, a relatively fixed hub exteriorly of substantially frusto-conical form, an interiorly tapered ring fitted upon said hub and having its outer face substantially cylindrical and formed with a circumscribing transversely curved, concave cushion seat in its outer face, a floating hub including an annular body disposed to surround the relatively fixed hub, an exteriorly tapered ring fitted within the said body and having a transversely convex inner face, and a cushion interposed between the said rings, the inner periphery of the cushion resting in said seat and the convex face of the outer ring bearing against the cushion.

4. In a vehicle wheel, a relatively fixed hub, exteriorly of substantially frusto conical form, an interiorly tapered ring fitted upon the said hub and having its outer surface substantially cylindrical and formed with a circumscribing concave seat, a floating hub including an annular body disposed to surround the relatively fixed hub, an exteriorly tapered ring fitted within the said body and having a transversely curved convex face, a cushion interposed between the rings and resting in said seat and spaced heads carried by the fixed hub and holding the said rings and cushion against lateral displacement.

5. In a vehicle wheel, a relatively fixed hub, exteriorly of substantially frusto conical form, and threaded at its minor end, an exteriorly tapered ring fitted upon the said hub, a floating hub including an annular body disposed to surround the relatively fixed hub, a ring fitted within the said body, a head carried by the fixed hub and fixed with relation thereto, a rim member fixed with relation to the head and spaced with respect thereto, the rim member being of annular form and having its inner periphery threaded, an annular head having its inner and outer periphery threaded respectively onto the threaded portion of the hub and into the threaded inner periphery of the rim member, and a cushion disposed between the said rings and confined between the said heads.

6. In a vehicle wheel, a relatively fixed hub, a head carried by the hub and fixed with respect thereto, a rim member carried by the head and spaced therefrom and of annular form and having its inner periphery threaded, the hub being exteriorly threaded, a floating hub disposed between the said head and the said rim member, an annular head having its inner and outer peripheries threaded respectively onto the threaded portion of the hub and into the said rim member, and a cushion disposed between the said hubs.

7. In a vehicle wheel, a relatively fixed hub, a floating hub assembled therewith, a cushion interposed between the hubs, the fixed hub having a plurality of openings and the floating hub having a plurality of tapered openings arranged to register with the openings in the fixed hub, when the hubs are in concentric relation, and a bolt threaded into each opening in the fixed hub, and having a conoidal head fitting in the corresponding tapered opening in the floating hub whereby to cause a wedging action between the pin and the floating hub upon a tendency toward circumferential movement of the floating hub relative to the fixed hub.

8. In a vehicle wheel, a shock absorber, comprising a non-yielding casing provided at one end with a flange and interiorly threaded at its other end, cushioning disks arranged within the casing one against another, the said flange constituting an abutment for the series of disks, and a head threaded into the last mentioned end of the casing and bearing against the adjacent end-most one of the series of disks, the said disks being formed with registering bolt-openings.

9. In a vehicle wheel, a shock absorber comprising a non-yieldable casing provided at one end with an annular flange, cushioning disks arranged within the casing one against another, the said flange constituting an abutment for the series of disks, and an annular head adjustably fitted within the casing and bearing against the adjacent end-most one of the series of disks, the said disks being formed with registering openings forming a passage extending axially through the absorber.

In testimony whereof I affix my signature in presence of two witnesses.

OTTO P. DOWNING. [L. S.]

Witnesses:
W. MARTIN WATSON,
C. H. McKNIGHT.